United States Patent
Gebhard

(10) Patent No.: US 10,033,630 B2
(45) Date of Patent: Jul. 24, 2018

(54) METHOD FOR CONFIGURING NETWORK ELEMENTS TO DELEGATE CONTROL OF PACKET FLOWS IN A COMMUNICATION NETWORK

(71) Applicant: Alcatel Lucent, Boulogne-Billancourt (FR)

(72) Inventor: Ulrich Gebhard, Ludwigsburg (DE)

(73) Assignee: Alcatel Lucent, Boulogne-Billancourt (FR)

( * ) Notice: Subject to any disclaimer, the term of this patent is extended or adjusted under 35 U.S.C. 154(b) by 136 days.

(21) Appl. No.: 15/032,146

(22) PCT Filed: Nov. 19, 2014

(86) PCT No.: PCT/EP2014/075045
§ 371 (c)(1),
(2) Date: Apr. 26, 2016

(87) PCT Pub. No.: WO2015/086277
PCT Pub. Date: Jun. 18, 2015

(65) Prior Publication Data
US 2016/0261491 A1  Sep. 8, 2016

(30) Foreign Application Priority Data

Dec. 12, 2013 (EP) ..................... 13196829

(51) Int. Cl.
*H04L 12/50* (2006.01)
*H04L 12/721* (2013.01)
*H04L 12/24* (2006.01)

(52) U.S. Cl.
CPC ........... *H04L 45/38* (2013.01); *H04L 41/042* (2013.01); *H04L 41/044* (2013.01); *H04L 41/0803* (2013.01); *H04L 41/0806* (2013.01)

(58) Field of Classification Search
CPC . H04L 12/54; H04L 12/5689; H04L 12/5696; H04L 12/64; H04L 12/66
(Continued)

(56) References Cited

U.S. PATENT DOCUMENTS 8,503,307 B2 * 8/2013 Tourrilhes ........... H04L 41/0816
370/230

8,605,734 B2 * 12/2013 Ichino ..................... H04L 45/38
370/351
(Continued)

FOREIGN PATENT DOCUMENTS

JP        2013522934 A       6/2013
WO   WO-2012101689 A1    8/2012
(Continued)

OTHER PUBLICATIONS

International Search Report PCT/ISA/210 for International Application No. PCT/EP2014/075045 dated Feb. 3, 2015.
Written Opinion of the International Searching Authority PCT/ISA/237 for International Application No. PCT/EP2014/075045 dated Feb. 3, 2015.
Bruno Nunes Astuto et al: "A Survey of Software-Defined Networking: Past, Present, and Future of Programmable Networks", In Submission, Jan. 1, 2013 (Jan. 1, 2013), XP055110892, Retrieved from the Internet <URL:http://hal.inria.fr/hal-00825087>.
Deepak Bansal et al: "OpenFlow Management and Configuration Protocol (OF-Config 1.1.1)", Mar. 23, 2013 (Mar. 23, 2013), XP055111102, Retrieved from the Internet <URL:https://www.opennetworking.org/images/stories/downloads/sdn-resources/onf-specifications/openflow-config/of-config-1-1-1.pdf>.
(Continued)

*Primary Examiner* — Dmitry H Levitan
(74) *Attorney, Agent, or Firm* — Harness, Dickey & Pierce, P.L.C.

(57) ABSTRACT

A method for providing control in a communication network including one or more network elements includes configuring a switch of a first network element of the communication network and a local controller of the first network element by means of one or more configuration messages received from a centralized controller and controlling one or more packet flows between one or more of the switch of the first network element, the local controller of the first network element, the centralized controller and one or more second network elements based on the configuration of the switch and of the local controller of the first network element.

13 Claims, 4 Drawing Sheets

(58) Field of Classification Search
USPC .................. 370/357, 360, 388, 389, 400
See application file for complete search history.

(56) References Cited

U.S. PATENT DOCUMENTS

| | | | |
|---|---|---|---|
| 8,964,752 B2* | 2/2015 | Zhang | H04L 45/38 370/392 |
| 8,989,194 B1* | 3/2015 | Poutievski | H04L 41/12 370/360 |
| 9,071,529 B2* | 6/2015 | Garg | H04L 47/12 |
| 9,253,117 B1* | 2/2016 | Poutievski | H04L 41/12 |
| 2013/0070762 A1 | 3/2013 | Adams et al. | |
| 2013/0117428 A1 | 5/2013 | Koponen et al. | |
| 2015/0172176 A1* | 6/2015 | Sasaki | H04L 69/22 370/392 |

FOREIGN PATENT DOCUMENTS

| | | |
|---|---|---|
| WO | WO-2013043604 A1 | 3/2013 |
| WO | WO-2013063330 A1 | 5/2013 |

OTHER PUBLICATIONS

Open Networking Foundation: "OpenFlow Switch Specification Version 1.4.0", Oct. 14, 2013 (Oct. 14, 2013), XP055111101, Retrieved from the Internet <URL:https://www.opennetworking.org/images/stories/downloads/sdn-resources/onf-specifications/openflow/openflow-spec-v1.4.0.pdf>.

Soheil Hassas Yeganeh et al: "Kandoo", Hot Topics in Software Defined Networks, ACM, 2 Penn Plaza, Suite 701 New York NY 10121-0701 USA, Aug. 13, 2012 (Aug. 13, 2012), pp. 19-24, XP058008058, DOI: 10.1145/2342441.2342446.

* cited by examiner

METHOD FOR CONFIGURING NETWORK ELEMENTS TO DELEGATE CONTROL OF PACKET FLOWS IN A COMMUNICATION NETWORK

CROSS-REFERENCE TO RELATED APPLICATIONS

This application is a national phase under 35 U.S.C. § 371 of PCT International Application No. PCT/EP2014/075045 which has an International filing date of Nov. 19, 2014, which claims priority to European patent application number EP 13196829.9 filed Dec. 12, 2013, the entire contents of each of which are hereby incorporated by reference.

BACKGROUND

The present invention is situated in the field of communication network and more particularly relates to a method and apparatus for providing control in a communication network.

In a communication network, there is a need to control the packet flows between the elements and devices of the network. Software Defined Networks (SDN) describe a network-control architecture in which complex network functions (e.g. path calculation, topology database maintenance) previously implemented in proprietary operating systems of geographically distributed routers and switches are shifted to a centralized controller, leaving the router or switch as a simple forwarding element which can be realized on commodity hardware and which can be programmed via an open interface by the centralized controller, here centralized SDN controller. The drawback of this architecture is that tasks previously handled locally by routers and switches now require interaction between network elements and the centralized controller thereby burdening the control network with messaging not interesting for intermediate nodes.

SUMMARY

The present invention aims to improve control in a communication network, in particular to improve the control of packets flows between the devices of the communication network (e.g. controller, router, switches, network elements).

The objective of the present invention is achieved by a method for providing control in a communication network. The communication network comprises one or more network elements. Preferably, the communication network comprises a first network element and one or more second network elements. Each network element comprises a switch and a local controller. Furthermore, the communication network comprises a centralized controller. The method for providing control in the communication network comprises configuring the switch of the first network element of the communication network and configuring the local controller of the first network element. The switch and the local controller of the first network element are configured by means of one or more configuration messages received from the centralized controller. The method for providing control in the communication network comprises furthermore controlling one or more packet flows between one or more of the switch of the first network element, the local controller of the first network element, the centralized controller and one or more of the one or more second network elements based on the configuration of the switch and of the local controller of the first network element.

The objective of the present invention is further achieved by a first network element comprising a switch and a local controller. The switch and the local controller are adapted to receive configuration messages from a centralized controller and adapted to control one or more packet flows between one or more of the switch of the first network element, the local controller of the first network element, the centralized controller and one or more second network elements based on the configuration of the switch and of the local controller of the first network element.

The devices, components and elements of the communication network might be implemented in any suitable manner as hardware, in particular programmable hardware, software or combination thereof. The features "devices", "components" and "elements" without further specification might be used likewise.

In particular, the local controller may be implemented as a single unit, a stand-alone device, or within a database, integrated in a computer and/or within a computer network. The local controller may be implemented through the use of hardware, software and/or hardware capable of executing software in association with appropriate software.

More specifically, the local controller can be comprised or implemented by circuit-based processes, including possible implementation as a single integrated circuit, such as an ASIC (=Application Specific Integrated Circuit) or such as an FPGA (=Field Programmable Gate Array), a multi-chip module, a single card, or a multi-card circuit pack. The functions of the local controller may be implemented as processing blocks in a software program. Such software may be employed in a digital signal processor, micro-controller, or general-purpose computer implemented as a single device or integrated in a computer network.

The local controller may comprise program code embodied in tangible media, such as magnetic recording media, optical recording media, solid state memory, floppy diskettes, CD-ROMs, hard drives, or any other machine-readable storage medium, wherein, when the program code is loaded into and executed in the local controller, the local controller becomes an apparatus used for practicing the invention.

In particular, for executing the present invention a computer program product is used which is adapted to execute the method of one of the claims 1 to 14, when executed on a computer, which is in particular a computer of the local controller.

Further features and advantages of the present invention are described in preferred embodiments as generally described in the following and illustrated below with regard to the figures in an exemplary way in the detailed description. It will be readily understood that the features and embodiments of the present invention, as generally described herein and illustrated in the figures in the following, may be arranged and designed in a wide variety of different configurations. Thus, the following general description and detailed description of the embodiments of a method and apparatus as represented in the attached figures, is not intended to limit the scope of the invention as claimed, but is merely representative of preferred embodiments of the invention.

The features, structures, or characteristics of the invention described throughout this specification may be combined in any suitable manner in one or more embodiments. For example, the usage of the phrases "preferred embodiments", "some embodiments", or other similar language, throughout this specification refers to the fact that a particular feature, structure, or characteristic described in connection with the embodiment may be included in at least one embodiment of the present invention. Thus, appearances of the phrases "preferred embodiments", "in some embodiments", "in other embodiments", or other similar language, throughout this specification do not necessarily all refer to the same group of embodiments, and the described features, structures, or characteristics may be combined in any suitable manner in one or more embodiments.

Furthermore, what is described throughout the description in the context of "packets" applies similarly to "one" packet accordingly, for example if in the description the forwarding of packets is described, the embodiment of forwarding one packet is also disclosed analogously.

Thus, the features described within one embodiment might be implemented in any suitable manner within one or more embodiments. In particular, the term "and/or" used to combine features of two or more embodiments is to be understood that a preferred embodiment might include the features which are linked by the term "and/or" in combination or only the first feature/feature group or only the second or following feature/group of features of the alternative enumeration. Similarly, the features of preferred embodiments might be combined, thereby forming further preferred embodiments.

In a preferred embodiment, the configuration of the local controller is made by configuration messages from the centralized controller. This means the operator of the centralized controller can configure the local controller by means of configuration messages sent from the centralized controller to the local controller. In a preferred embodiment, the configuration messages are exchanged between the centralized controller and the network element comprising the switch and the local controller. This means configuration messages are sent from the centralized controller to the network element and thus to the switch and possibly forwarded to the local controller. Furthermore, configuration response messages might be sent from the network element, or more precisely from the switch and/or from the local controller back to the centralized controller. By the configuration response messages, the device, i.e. switch and/or local controller which is configured by the configuration messages, gives feedback to the centralized controller, such as successful or unsuccessful configuration or request for missing configuration data or request for data concerning network state which may be stored in a local database in case the local controller has functions for administering network state or back-sending of requested configuration data.

In a preferred embodiment, the configuration of the local controller via configuration messages from the centralized controller is done by programming the local controller via configuration messages exchanged between the centralized controller and the network element. As will be described in more detail below, the configuration messages are sent to the network element and are within the network element further processed for the configuration of the switch and possibly and in particular of the local controller. Preferably, the interface over which the configuration messages of the switch are exchanged with the centralized controller and the interface over which the configuration messages of the local controller are exchanged with the centralized controller is the same interface. This means the configuration messages via which the switch is programmed, i.e. configured, and the configuration messages via which the local controller is programmed, i.e. configured, are sent over the same interface between the centralized controller and the network element comprising the switch and the local controller. Preferably, the physical port of the network element over which the configuration messages for the switch is sent is the same port of the network element over which the configuration messages for the local controller is sent. In this case, the port address of the port of the network element over which the configuration messages are received by the network element is the same port address as of the port of the network element over which the configuration messages for the local controller are received by the network element, because the port and thus the port address is the same. This means, the configuration messages for the switch and the configuration messages for the local controller are received at the same port of the network element.

It is to noted that throughout the present application, the feature "port" refers to a physical port and the feature "sub-address" refers to a logical port.

In a preferred embodiment, the configuration messages for configuring, i.e. programming, the local controller are received from the centralized controller at the switch of the network element and forwarded by the switch to the local controller.

In a preferred embodiment, the configuration messages and further packet flows may be sent over different ports and/or over different connections.

In a preferred embodiment, the configuration messages for the switch and for the local controller can be received via a separate control network. Preferably, the control network is independent from the data network. Preferably, the control network is defined as a network over which the configuration messages are exchanged between the centralized and the switch and the local controller. Preferably, the data network is defined as the network over which further data flows or packet flows are exchanged or transported.

In a preferred embodiment, for the configuration of the local controller of the first network element, the switch of the first network element receives one or more configuration messages from the centralized controller and forwards the configuration messages to the local controller of the first network element.

Preferably, the configuration messages which are sent to the network element which comprises the switch and the local controller include the address of the network element and further the sub-address of the switch alone, if the configuration messages are used for the switch. Preferably, the configuration messages which are sent to the network element include the address of the network element and further the sub-address of the local controller, in case the configuration messages are used for configuration of the local controller.

In a preferred embodiment, the configuration messages comprise the address of the network element as outer address indication, for example outer label and the address of the switch or of the local controller as inner address indication, for example inner label, for example sub-address.

In a preferred embodiment, the configuration messages comprise the sub-address of the switch only in case the configuration messages are used for configuring the switch. In case, the configuration messages are used for configuration of the local controller, the configuration messages comprise beside the address of the network element as outer address, the address only of the local controller as sub-address.

Preferably, the configuration messages are received by the switch which decides according to the addresses, preferably more precisely sub-addresses, indicated in the messages, if the configuration messages are to be implemented at the switch, i.e. for configuration of the switch, or if the configuration messages are to be implemented by the local controller, i.e. for configuration of the local controller. In a preferred embodiment, the configuration messages are forwarded to the local controller, this means the configuration messages sent from the centralized controller to the network element are forwarded via the switch to the local controller. In another preferred embodiment, the configuration messages are received via a separate control network at another port and forwarded to the switch or to the local controller according to the sub-address of the switch or to the local controller, respectively.

In a preferred embodiment, in a first step the switch is configured by the centralized controller. In a preferred embodiment, the sub-addresses of the switch and of the local controller are known to the centralized controller by means of standardization or by manuals or data sheets of equipment vendors.

As in this case the configuration of the switch comprises a rule which in preferred embodiments includes the address of the local controller, the switch is adapted or configured to forward data packets, in particular configuration messages, to the local controller, because the switch is configured with rules to forward configuration messages which carry the sub-address of the local controller to the local controller. Thereby, the centralized controller can address both switch and local controller and the switch can be configured to forward data packets, in particular configuration messages, to the local controller, because the switch is configured with rules to forward packets whose sub-address field matches the sub-address of the local controller, to the local controller.

What is described herein in regard of the first network element, applies correspondingly to the second network elements, which might also be configured by configuration messages from the centralized controller and involved in the control of packet flows in the communication network as described from the point of view of the first network element.

In a preferred embodiment, the step of controlling the one or more packet flows between the centralized controller, the switch of the first network element, the local controller of the first network element and one or more second network elements based on the configuration of the switch and of the local controller comprises receiving packets of a packet flow of the one or more packet flows at the switch of the first network element, deciding at the switch of the first network element on the further forwarding of the packets of the packet flow and forwarding the packets of the packet flow at the switch.

In a preferred embodiment, similarly as for the configuration messages, each packet which is sent to the switch might preferably comprise the address of the network element in which the switch is implemented as outer address label and the address of the network element or device, e.g. of the local controller to which the packet should be forwarded by the switch as inner address label or sub-address.

In a preferred embodiment, similarly as for the configuration messages, each packet which is sent to the switch might preferably comprise the address of the centralized controller as outer address label, preferably IP-address, and the address of the centralized controller to which the packet should be forwarded by the switch as inner address label or sub-address, preferably logical port.

In a preferred embodiment, similarly as for the configuration messages, each packet which is sent to the switch might preferably comprise the address of the centralized controller as outer address label and the address of the protocol stack of the centralized controller to which the packet should be forwarded by the switch, as inner address label, or sub-address. The protocol stack is the administrative entity of the centralized controller in this context.

The address of the device to which the packet is to be forwarded, might be implemented as sub-address and might in particular be implemented as a software instance indication. The address or the sub-address of a port might be the logical port address in case the communication network is implemented by logical addresses.

In a preferred embodiment, for controlling the one or more packet flows in the communication network, the switch of the first network element receives packets of a packet flow of the one or more packet flows. After receiving the packets, the switch of the first network element decides on the forwarding of the packets of the packet flow and forwards the packets of the packet flow according to the decision.

In a preferred embodiment, the switch forwards the packets of the packet flow to the centralized controller or to the local controller or to one or more of the one or more second network elements according to a result of the step of deciding by the switch on the forwarding of the packets of the packet flow.

In a preferred embodiment, the decision of the switch of the first network element on the forwarding of the packets of a packet flow depends on the fact, whether the packet flow is known or unknown to the switch according to the configuration of the switch.

In a preferred embodiment, the packet flow is a known packet flow to the switch according to the configuration of the switch. As the switch knows the packet flow, the switch determines a target of the packets of the packet flow according to the configuration of the switch for the forwarding of the packets of the packet flow.

In a preferred embodiment, the packet flow is an unknown packet flow to the switch according to the configuration of the switch. As the switch does not know the packet flow, the switch sends one or more packets of the unknown packet flow to the centralized controller or to the local controller according to the configuration of the switch.

In a preferred embodiment, the switch is configured to send one or more packets of a packet flow, which is unknown to the switch, to the centralized controller for deciding on the further forwarding of a packet flow unknown to the switch. Accordingly, the switch sends one or more packets of the unknown packet flow to the centralized controller. The centralized controller determines a target of the packets and indicates the target of the packet flow to the switch. The centralized controller might determine the target of the packet flow based on a look-up table in which addresses and rules are included for determining the target of packet flows. The centralized controller might indicate the target of the packet flow by setting the target of the packet flow in the header fields of one or more packets of the packet flow, which have been sent to the centralized controller for determining the target, and send the packets with the indicated target back to the switch. Alternatively, the central controller might sent a message to the switch indicating the target of the packet flow which has been sent to the centralized controller from the switch for determining the target of the packet flow. The indication of the target of the packet flow might in particular be a port address via which the packet flow is to be forwarded by the switch. This applies in particular in case the switch which does not know the packet flow can not determine the port address from the packet flow for further forwarding by itself. However, as the switch has been informed of the port address for forwarding the packet flow by the indication from the centralized controller, the switch now is able to forward the packet flow and will forward the packet flow accordingly.

In a preferred embodiment, the switch is configured to send one or more packets of a packet flow, which is unknown to the switch, to the local controller for deciding on the further forwarding of a packet flow unknown to the switch. Accordingly, the switch sends one or more packets of the unknown packet flow to the local controller. The local controller determines a target of the packets and indicates the target of the packet flow to the switch. The local controller might determine the target of the packet flow based on a look-up table in which addresses and rules are included for determining the target of packet flows. The local controller might indicate the target of the packet flow by setting the target of the packet flow in the header fields of one or more packets of the packet flow, which have been sent to the local controller for determining the target, and send the packets with the indicated target back to the switch. Alternatively, the local controller might sent a message to the switch indicating the target of the packet flow which has been sent to the local controller from the switch for determining the target of the packet flow. The indication of the target of the packet flow might in particular be a port address via which the packet flow is to be forwarded by the switch. This applies in particular in case the switch which does not know the packet flow can not determine the port address from the packet flow for further forwarding. However, as the switch has been informed of the port address for forwarding the packet flow by the indication from the local controller, the switch now is able to forward the packet flow and will forward the packet flow accordingly.

It is noted that according to the definition throughout this specification, a packet flow is unknown to the switch, if the switch can not determine based on the header fields including in preferred embodiments in particular e.g. the address indicated in the packet flow, which might be the address of the receiver or possibly of the source, to which network element the packet flow should be sent or via which port the packet flow is to be forwarded to a network element. In this case, the switch is configured to send one or more packets of the packet flow to the centralized controller or to the local controller. Although the switch is configured to sent one or more packets of the packet flow to the centralized controller or to the local controller in order to get an indication of the target or port where to forward the packet flow, the packet flow is termed as unknown to the switch, because the forwarding to the centralized or local controller is only the default setting for determining of the target or port of the packet flow which is without this indication unknown to the switch. Therefore, packet flow is termed as unknown to the switch.

In preferred embodiment, if throughout the present application, the indication of the target is described with reference to the address indicated in the packet flow, more generally the target might be indicated by the header fields included in the packets which are to be forwarded. The header fields might comprise a combination of information, e.g. packet type or priority or application type and further header fields as the skilled person will appreciate.

In a preferred embodiment, two packets with the same target address can be forwarded to different ports dependent on the priority fields. The different ports might be different physical and/or logical ports.

Furthermore, a packet flow is termed as unknown to the switch, if the switch without the above indication of the centralized or local controller can not determine where to forward the packet flow based on its configuration, in particular based on its look-up table. In contrast, a packet flow is known to the switch, if the switch can determine based on its configuration, in particular based on its look-up table, where to forward the packet flow. This determination might be based on the indicated address in the packet flow, in particular the address of the network element to which the packet flow should be forwarded. Alternatively or in addition, the switch might determine from the source address, where to forward a packet flow which is therefore known to the switch. For example, the switch might be configured to forward all packets of a particular sending network or of a particular first network element from which the switch as received the packet flow to a particular second network element. Alternatively or in addition, the switch might be configured to forward packets of a particular application to a particular network element. Alternatively or in addition, the switch might be configured to forward packet flows with a particular address or application to a particular output port of the switch.

In a preferred embodiment, the method for controlling the one or more packet flows comprises forwarding packets of one or more of the one or more packet flows from the switch of the first network element to one or more of the one or more second network elements based on the configuration of the switch and based on rules applied by the local controller according to the configuration of the local controller. The rules applied by the local controller according to the configuration of the local controller might be data that the local controller has received from the centralized controller for the setting of parameters in the switch and/or derived from topology information that the local controller has stored and processed. Accordingly the local controller might set parameters in the switch for further forwarding.

In a preferred embodiment, for controlling the one or more packet flows, the packets of the packet flow are forwarded to the local controller. The local controller interprets header fields in the received packets of the packet flow based on rules according to the configuration of the local controller. After interpreting the header fields of the packets, the local controller forwards the packets.

In a preferred embodiment, for controlling the one or more packet flows, the packets of the packet flow are forwarded to the local controller. The local controller interprets header fields in the received packets of the packet flow and adapts, i.e changes, the header fields according to the configuration of the local controller. After adapting the header fields of the packets, the local controller forwards the packets according to the configuration of the local controller.

In a preferred embodiment, for controlling the one or more packet flows, the packets of the packet flow are forwarded to the local controller. The local controller interprets header fields in the received packets of the packet flow based on rules according to the configuration of the local controller. After interpreting the header fields of the packets, the local controller forwards the packets to its internal protocol stack for processing. Preferably, these packets are destined for the local controller.

In a preferred embodiment, the step of controlling the one or more packet flows further comprises forwarding the packets of the packet flow to the local controller, interpreting header fields in the received packets of the packet flow based on rules according to the configuration of the local controller, and forwarding the packets to its internal local protocol stack, i.e, of the local controller, for further processing, thereby terminating the packets.

In a preferred embodiment, the local controller has a packet/frame generator. By means of the packet/frame generator, the local controller is able to generate new packets. As will be explained in more detail in the following, the local controller might be able to generate completely new packets, to generate new header fields for existing packets and/or to interpret and possibly redefine the header fields of the packets. Preferably, the local controller sends the new packets to one or more of the one or more second network elements.

In this context, it is to be noted that if throughout this specification, the feature "packet" is used, the person skilled in the art will appreciate that depending on the implementation instead of "packet", the feature "frame" might be addressed also. This means, instead or in addition of processing packets, frames might be processed similarly according to the implementation of the processing, for example control, of packet flows, thus flows of frames. Even more generally, the teaching of the present invention might be applicable on every level of the OSI reference model (including packets, frames, segments etc.) In a preferred embodiment, after interpreting header fields in the received packets of the packet flow based on rules according to the configuration of the local controller, the local controller generates new packets with new header fields by a packet/frame generator of the local controller.

In a preferred embodiment, the local controller, in particular by means of the packet/frame generator of the local controller, is configured to generate new header fields in any way predefined by the configuration of the local controller.

The local controller might be configured to generate new packets e.g. with a length for the source address with two bytes shorter (e.g. only six bytes instead of eight bytes) and also for the target address with two bytes shorter thus saving 4 bytes. This might apply in case six bytes are sufficient for defining all used source and target addresses, respectively. The local controller might use the remaining 4 bytes for e.g. extended type fields and/or to indicate a priority in the header fields of the packets.

In a preferred embodiment, the local controller creates one or more messages by means of the packet/frame generator and sends the one or more messages via the switch to one or more of the one or more second network elements.

In preferred embodiments, the local controller, particularly by means of the packet/frame generator, might create messages by means of generated packets. The local controller might create periodic messages to direct neighbours like hello messages used by routing protocols. The local controller might create link integrity checks, operation and/or maintenance messages like trace, loopback and ping. The local controller, in particular if the topology discovery is delegated to network elements, and if the local controller is configured for topology discovery processing, might create link state protocol data units (LSPs) used by routing protocols.

In a preferred embodiment, the local controller might be configured to maintain local state by storing state machines and/or a table of learned MAC addresses, a database of routing-protocol neighbours and/or a topology database.

In a preferred embodiment, the centralized controller communicates with the switch of the first network element and with the local controller of the first network element via an interface preserving the concept of open programmability. Preferably, the interface is defined by the OpenFlow protocol.

In a preferred embodiment, the local controller might be suited for being configured in any way how the operator of the network element wants to configure the local controller, i.e. not restricted by vendor-specific implementation of pre-configuration. Similarly, the switch might be suited for being configured in any way how the operator of the network element wants to configure the switch. The operator of the network element comprising the switch and the local controller is able to provide a complete configuration of the switch, the local controller and thereby of the network element, without any restriction by vendor-specific implementation. In other words, in contrast to network elements, such as routers or switches, which are pre-configured by the vendor, e.g. retailer, of the network elements, and which allow only configuration of predefined parameters, in the present invention, the network elements, and such the switch, router and local controller inside the network elements, are programmable in any way, without vendor-specific restrictions, by the operator of the network elements including the switch, router and local controller. This concept of open programmability might be for example defined by the Openflow protocol. Similarly, the operator of the centralized controller which might be the same as the operator of the local controller, might configure the switch (or router) and the local controller in any way how he wants to configure these devices.

Preferably, the configuration of the local controller can be provided by the operator of the communication network in any way how the operator wants to configure the local controller, this means not restricted by limitations given by the vendor of the local controller or of the network element which comprises the local controller.

The interface between the centralized controller and the network elements, and thus between the centralized controller and the switch and/or between the centralized controller and the local controller might be defined as Southbound interface. The term Southbound interface might be used for the interface between the centralized controller and the nodes being forwarding or network elements.

As a general remark, what is described herein in regard of a switch applies correspondingly to a router in case the network element instead or in addition of a switch comprises a router.

In preferred embodiments, the packets of packet flows of configuration messages and of further packet flows which are sent from the centralized controller to the network element comprising the switch and the local controller are received via the same interface between the centralized controller and the network element, in particular via the same port or ports. The packets of packet flows of configuration messages and of further packet flows sent from the centralized controller to the network element might be received on the same port or ports of the network element, in particular on the same physical port or ports. The packets of packet flows of configuration messages and of further packet flows might be received on the same physical port, but on different logical ports, i.e. the packets of configuration messages might be received on a logical port of the network element different from the logical port or ports on which the packets of further packet flows are received on the network element. The packets of packet flows of configuration messages and of further packets flows might be received on the same physical and same logical port or ports. The further packet flows in this context might be data flows or any packet flows which are sent from the centralized controller to the network element, in particular packet flows which are controlled based on the configuration of the switch and of the local controller. One example of such a packet flow is a packet flow which comprises the indication of the target address of an unknown packet flow which the switch has sent to the centralized controller for determination of the target of the packet flow. The indication messages sent from the centralized controller to the network element including the switch might be received on the same port on which the switch has received configuration messages from the centralized controller, wherein the same port might be the same physical and same logical port or the same physical, but different logical port as for the configuration messages. What is described above in regard of the port(s) of the network element, might apply likewise in regard of the port of the centralized controller.

As the local controller is configured to provide control of the data flows within the communication network as described throughout the specification, the centralized controller is deprived or relieved of much burden of control processing to the extent the local controller is configured to provide the control which without the local controller should have to be processed by the centralized controller. For example, without the local controller, the messages and data packets which are processed by the local controller would have to be exchanged between the centralized controller and the network elements.

Furthermore, as the local controller is configured to provide control of the data flows as described throughout this specification, for the network elements such as switches and routers, commodity hardware can be used. As the centralized controller delegates control functions to the local controller, the local controller provides control of the data or packet flows in cooperation with the centralized controller. This allows the use of simple and thus cheap switches and routers within the network elements. In order to express that the network elements including routers and switches have quite restricted or even no control functions, but are merely forwarding elements, the network elements might be termed as forwarding elements.

Furthermore, it is to be underlined that the expression "the local controller controls one or more packet flows" is not to be understood that the one or more packet flows are controlled only by the local controller. This means that the control of the one or more packet flows is not provided only by the local controller, but the control of the one or more packets flows is provided in particular by both the centralized controller and the local controller and further by the switch or router as far as the have control functions according to their configuration, for example deciding on the forwarding of packet flows according to the configuration of the switch or router. Thus, the extent of the control by the local controller is disclosed in the claims and in exemplary details described throughout the specification.

In a preferred embodiment, the communication network might also comprise one or more second centralized controllers which are implemented in addition to the described centralized controller. The one or more second centralized controller might be used as redundant centralized controllers in case the above described centralized controller which in this case would be the primary centralized controller fails. Alternatively or in addition, one or more of the second centralized controllers might be configured for defined partitions of the communication network or for a plurality of communication networks which are in communication one to another.

The communication network might also comprise application elements implemented in hardware and/or software, such as computers. The application elements might be communication devices (telephone, video etc.). The interface between a centralized controller and one or more application elements might be defined as Northbound interface. The term Northbound interface might be used for the interface between the centralized controller and applications.

In a preferred embodiment, the local controller might be defined as "Satellite Controller". In a preferred embodiment, the communication network might be a "Software Defined Network" (SDN). In a preferred embodiment, a local controller might be a satellite SDN controller (SSC) and a centralized controller might be a centralized SDN controller (CSC). The packets coming from the centralized SDN controller or from the satellite SDN controller (in particular to the switch) might be defined as packet_out and the packets received by the centralized SDN controller or by the satellite SDN controller (coming in particular from the switch) might be defined as packet_in according to the OpenFlow specification.

In a preferred embodiment, a local controller might be implemented in a modular manner comprising a plurality of satellite controllers with different tasks within one network element. Preferably, each of the satellite controllers might be addressed via one logical port different from the logical ports of the other satellite controllers of the modularly implemented local controller. Preferably, each of the satellite controllers are connected to the same physical port and addressed via the same logical port. Preferably, each of the satellite controllers might be addressed via the same logical port, if they are connected to different physical ports. Preferably, each of the satellite controllers are connected to different physical ports and addressed via the same logical port. Preferably, each of the satellite controllers are connected to different physical ports and addressed via different logical ports.

In a preferred embodiment, a satellite controller might be implemented in a modular manner comprising a plurality of modules of the satellite controller with different tasks within one network element. Preferably, each of the modules of the satellite controller might be addressed via one logical port different from the logical ports of the other modules of the modularly implemented satellite controller. Preferably, each of the modules are connected to the same physical port and addressed via the same logical port. Preferably, each of the modules might be addressed via the same logical port, if they are connected to different physical ports. Preferably, each of the modules are connected to different physical ports and addressed via the same logical port. Preferably, each of the modules are connected to different physical ports and addressed via different logical ports.

In a preferred embodiment, a local controller comprises a plurality of modules within one network element, wherein each module of the plurality of the modules implements one or more tasks different from the tasks implemented by the other modules of the plurality of the modules, wherein each of the modules is addressed via one logical port different from the logical ports of the other modules. Preferably, each of the modules are connected to the same physical port and addressed via the same logical port. Preferably, each of the modules might be addressed via the same logical port, if they are connected to different physical ports. Preferably, each of the modules are connected to different physical ports and addressed via the same logical port. Preferably, each of the modules are connected to different physical ports and addressed via different logical ports.

In a preferred embodiment, a local controller might be implemented in a virtual manner. A virtual or virtualized local controller comprises a plurality of instances, in particular software instances, within one network element. Each of the software instances might implement one or more tasks different from the tasks of the other software instances. Alternatively, one or more of the software instances might implement one or more same tasks. The software instances of the local controller might be controlled by a plurality of administrators or operators of the network element, i.e. by different administrators or operators. Each administrator or operator might control one or more of the software instances. Each administrator or operator might control one or more software instances different from the software instances controlled by the other administrators or operators of the plurality of administrators or operators. Preferably, the communication network might be implemented as a "multi-tenant network" which is controlled by a plurality of administrators or operators.

In a preferred embodiment, a local controller comprises a plurality of instances, in particular software instances, within one network element, wherein each of the instances of the local controller implements one or more tasks and wherein each of the instances of the local controller is controllable by one administrator of a plurality of administrators.

In a preferred embodiment, one or more local controllers are shipped by equipment manufacturers with some basic pre-configuration which later can be overwritten or deactivated by the centralized controller. Preferably such pre-configuration might comprise basic routing-protocol functionality for the discovery of the control-network topology and for the establishment of the communication channel with the centralized controller. Preferably such pre-configuration resides in some non-volatile memory, e.g. Eprom.

A network element might be termed also as a node of the communication network.

The present invention allows the use of commodity hardware for the network elements. Furthermore, as the network elements, in particular the switches, routers and the local controller are configurable in any way the operator of the network elements and/or the operator of the centralized controller, which might be the same operator, wants, this is without vendor-specific restrictions, the present invention allows the introduction of new protocols and this in particular by the definition of new packets formats, in particular by the use of the packet/frame generator of the local controller.

BRIEF DESCRIPTION OF THE FIGURES

Features and advantages of the present invention will be more completely understood by appreciating a detailed illustrative description of embodiments, where.

DETAILED DESCRIPTION OF EMBODIMENTS

Figure 1:
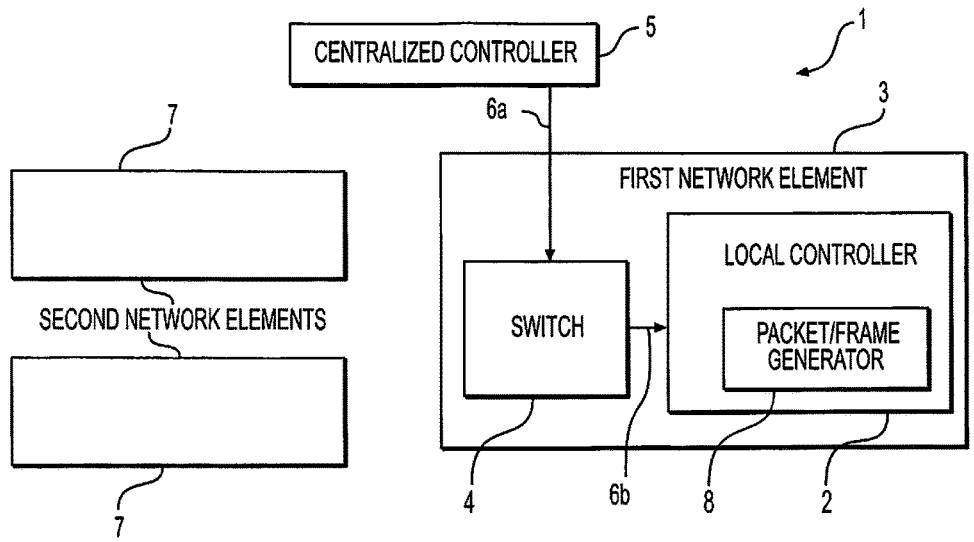
FIG. 1 depicts elements of a communication network and steps of a method for providing control in a communication network

FIG. 1 depicts a part of a communication network 1, in which for exemplary reasons some devices and elements are depicted, which are in the following described in more detail. The communication network 1 comprises network elements 3, 7 and a centralized controller 5. The skilled person will appreciate that the communication network 1 might comprise a plurality of the described devices and elements and further components such as application elements which are not depicted. FIG. 1 depicts furthermore steps for configuring the switch 4 and the local controller 2.

FIG. 1 depicts a first network element 3 and two second network elements 7. The communication network 1 will usually comprise a plurality of second network elements 7 which are not depicted. The inner implementation of a network element is depicted for exemplary reasons in the first network element 3. The second network elements 7 might have the same or equivalent inner implementation. The first network element 3 comprises a switch 4 and a local controller 2. Furthermore, the local controller 2 comprises a packet/frame generator 8.

In order to implement the method to provide control in the communication network 1, the switch 4 and the local controller 2 of the first network element 3 are configured. Based on the configuration of the switch 4 and of the local controller 2 one or more packet flows between at least two components, elements or devices of the communication network 1 comprising the first network element 3, the switch 4 of the first network element 3, the local controller 2 of the first network element 3, the centralized controller 5 and the one or more second network elements 7 are controlled.

It is noted that corresponding configuring which is described in regard of the first network element 3 might be implemented for the second network elements 7. For configuring the switch 4 of the first network element 3 of the communication network 1 and the local controller 2 of the first network element 3, the centralized controller 5 sends one or more configuration messages to the first network element 3 which comprises the switch 4 and the local controller 2.

Such as the packet flows which are controlled by the configuration of the switch 4 and of the local controller 2, the configuration messages also are preferably one or more flows of packets. Therefore, the packets flows which are processed in the communication network 1 might comprise the configuration messages used to configure the switch 4 and the local controller 2 and further packet flows such as communication data (e-mail data, internet, telephone, television, further data flows, in particular IP-flows). If the packet flows which are explicitly used for the configuration of the switch 4 and of the local controller 2 are referred to, these flows are termed as configuration messages. The term packet flow as such refers to any packet flow which is processed and controlled in the communication network according to the teaching of the present application.

The switch 4 of the first network element 3 receives (see FIG. 1, reference sign 6a) one or more configuration messages from the centralized controller 5. In case the switch 4 determines that the configuration messages received (see FIG. 1 ref. sign, 6a) are destined for the configuration of the switch 4, the switch 4 will implement configuration of the switch 4 accordingly. In case the switch 4 determines that the configuration messages received (see FIG. 1 ref. sign. 6a) are destined for the configuration of the local controller 2, the switch 4 forwards the configuration messages to the local controller 2 (FIG. 1, ref. sign 6b). The switch 4 might determine by the sub-address in the packets of the configuration messages, if the configuration messages are destined for the switch 4 or for the local controller 2. Preferably, a first address indicated in the packet header is the address of the network element 3 and a second address in the packet header is the address of the switch 4, if the configuration messages are destined for configuration of the switch 4. If the configuration messages are destined for configuration of the local controller 2, the second address is the address of the local controller 2. The second address might be a sub-address or a software instance indication.

The implementation and processing of addresses, sub-addresses, software instance indications described in the context of configuration messages might apply similarly for any packet flows processed, in particular controlled, within the communication network 1.

In case the switch 4 determines that the configuration messages are destined for the configuration of the local controller 2, the switch 4 forwards the configuration messages to the local controller 2 (FIG. 1, ref. sign 6b). By means of the configuration messages the local controller 2 is configured for controlling one or more packet flows between one or more of the devices, elements and components of the communication network 1 as described throughout this specification.

Preferably, to implement the configuration of the switch 4 and of the local controller 2, the centralized controller 5 might in a first step send configuration messages for the configuration of the switch 4 and in a second step for the configuration of the local controller 2. The configuration messages for the switch 4 might in particular comprise the address of the local controller 2, so that if the switch 4 receives configuration messages for the local controller 2, the switch 4 knows the address of the local controller 2 and is able to forward the configuration messages destined for the local controller 2 to the local controller 2.

Figure 2:
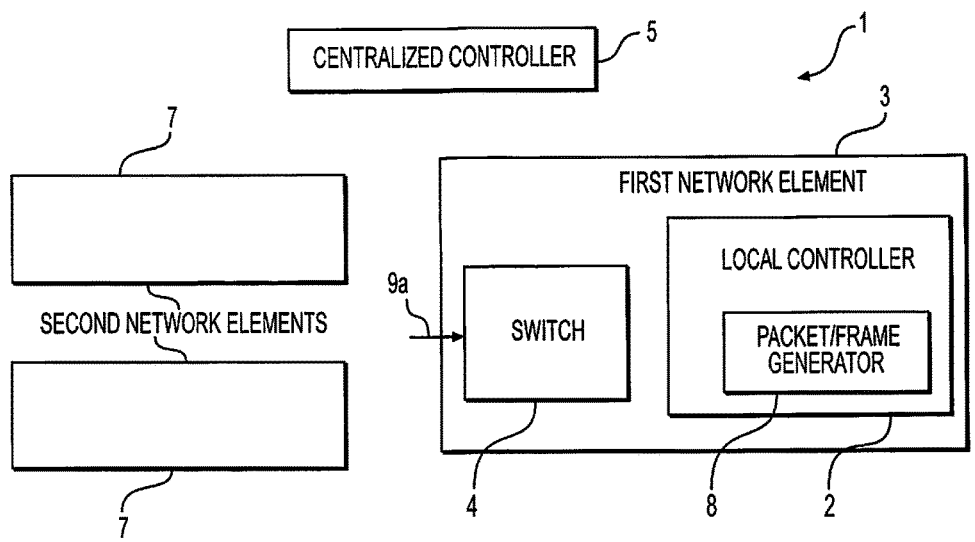
FIG. 2 depicts elements of a communication network and steps of a method for providing control in a communication network

FIG. 2 illustrates steps of a method for controlling one or more packet flows in the communication network 1. The switch 4 of the first network element 3 receives packets of a packet flow (FIG. 2, ref, sign 9a). The packet flow might come from one of the second network elements 7. In further embodiments, the packet flow might come from the centralized controller 5 or from the local controller 2. The switch 4 will decide on the forwarding of the packets of the packet flow and will forward the packets of the packet flow accordingly.

If the switch 4 determines that the packets of the packet flow are to be forwarded to the centralized controller 5, the switch will forward the packets of the packet flow to the centralized controller 5. Analogously, the switch 4 will forward the packets to the local controller 2 or to one or more of the second network elements 7, in case the switch determines that the packets are destined for the local controller 2 or for one or more of the second network elements 7, respectively.

The process of the decision of the switch 4 on the further forwarding of a received packet flow depends on whether the switch 4 knows the received packet flow or not. In other words, to obtaining the target of the packet flow, the switch 4 first determines, if the received packet flow is known to the switch 4 according to the configuration of the switch 4. The switch 4 will preferably in particular determine by a look-up table comprising addresses and targets of packet flows, if the switch 4 knows the target of the received packet flow. In a preferred embodiment, the switch 4 determines in particular if the look-up table comprises a match between the header fields and a rule configured into the switch 4 where to forward the packet flow so that the switch 4 forwards the packet flow accordingly. In a preferred embodiment, the switch 4 determines if the look-up table comprises a match between the header fields, including in particular the target address of the received packet flow, and a rule configured into the switch 4 where to forward the packet flow so that the switch 4 forwards the packet flow accordingly. If the look-up table does not comprise a matching rule for the header fields of the received packet flow, this means the switch 4 can not determine where to forward the packet, a default configuration is provided. Preferably, according to the default configuration the packet is forwarded to the centralized controller. Alternatively or in addition, according to the default configuration, the packet is forwarded to the local controller. Preferably, the packet can be discarded. Preferably, the packet can be forwarded to one or more predefined physical and/or logical ports.

If the packet flow is a known packet flow according to the configuration of the switch 4, the switch 4 determines the target of the packets of the packet flow according to the configuration of the switch 4.

Figure 3:
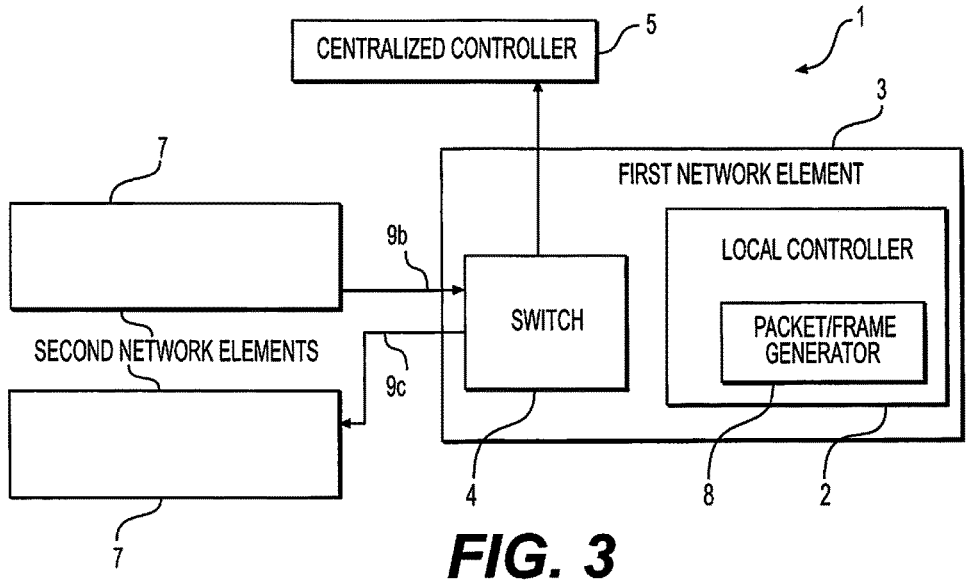
FIG. 3 depicts elements of a communication network and steps of a method for providing control in a communication network

FIG. 3 illustrates the forwarding of a particular known packet flow. The switch 4 receives packets of a packet flow from one of the second network elements 7 (FIG. 3, ref. sign 9b). The switch 4 determines that the received packet flow is known to the switch 4 and in particular that the packet flow is to be forwarded to one or more second network elements 7, preferably not the same second network element, from which the packet flow is received, except the situation that the packet flow should be sent back to sender. Accordingly, the packet flow is received from one of the second network elements 7 and forwarded by the switch to one or more preferably different second network element(s) 7, i.e. different from the sending one (FIG. 3, ref. sign 9c).

Figure 4:
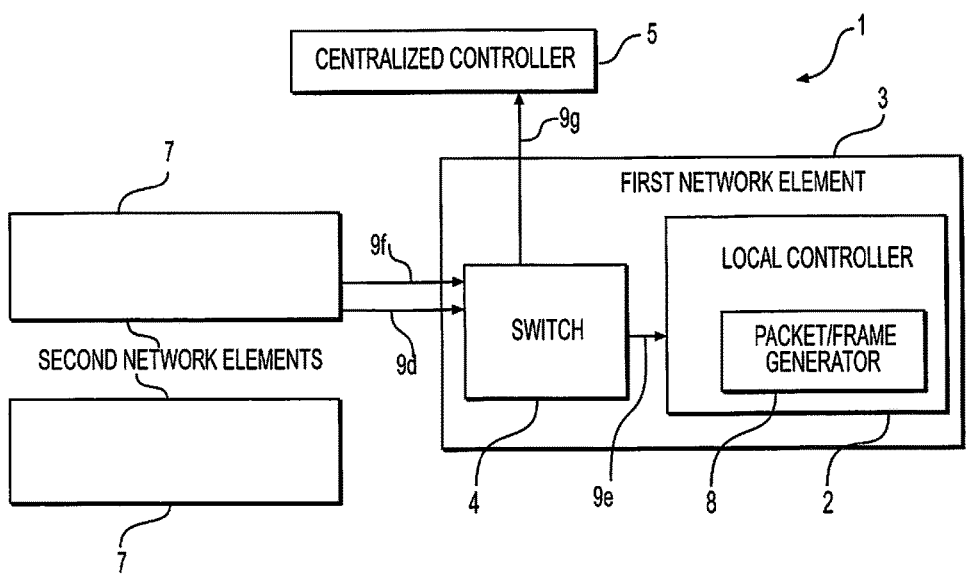
FIG. 4 depicts elements of a communication network and steps of a method for providing control in a communication network

In another exemplary embodiment depicted in FIG. 4, the switch 4 receives a packet flow (FIG. 4, ref. sign 9d) and determines that the received packet flow is known to the switch 4 and that the target of the packet flow is the local controller 2. Accordingly, the switch 4 forwards the packet to the local controller 2 (FIG. 4, ref. sign 9e).

In yet another exemplary embodiment, also depicted in FIG. 4, the switch 4 receives a packet flow (FIG. 4, ref. sign 9f) and determines that the packet flow is known to the switch 4 and that the target of the packet flow is the centralized controller 5. Thus, the switch 4 forwards the packet flow to the centralized controller 5 (FIG. 4, ref. sign 9g).

In another exemplary embodiment, the switch 4 receives a packet flow which is unknown to the switch 4 according to its configuration. In this case, the switch 4 can not determine by its configuration, in particular by its look-up table, for which network element or device the packet flow is destined. For example, the switch 4 receives a packet flow from one of the second network elements 7, but the address indicated in the packets of the received packet flow is unknown to the switch 4. In particular, the look-up table of the switch 4 does not comprise an entry of the address of the received packet flow or no match of the indicated address with a target. In this case, the switch 4 will determine the target of the packet flow with the help of either the centralized controller 5 or the local controller 2.

Figure 5:
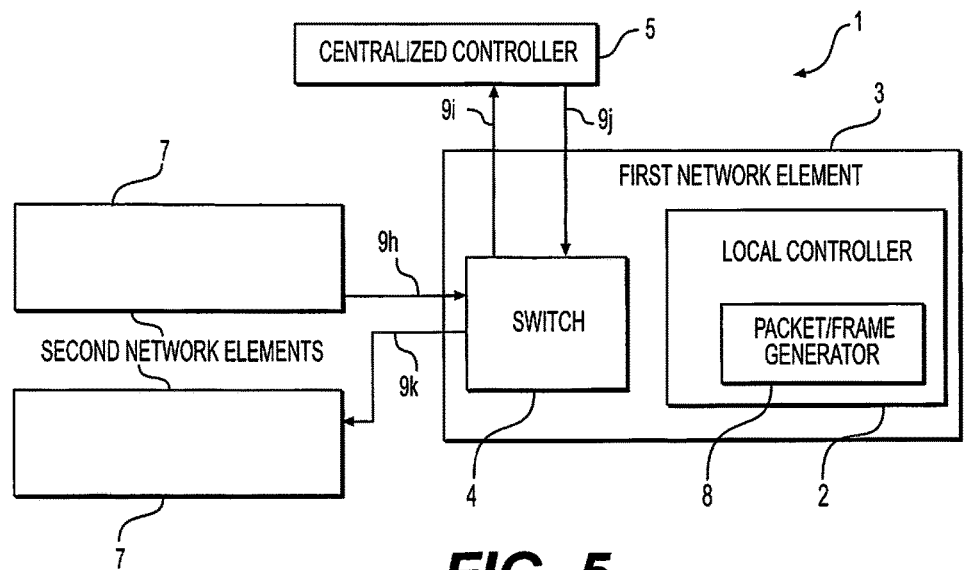
FIG. 5 depicts elements of a communication network and steps of a method for providing control in a communication network

In a preferred embodiment, the switch 4 receives a packet flow (FIG. 5, ref. sign 9h) and determines that the switch 4 does not know the packet flow according to its configuration. In this embodiment, the switch 4 is configured to forward packets of an unknown packet flow received by the switch 4 to the centralized controller 5. In other words, the configuration of the switch 4, in particular the look-up table of the switch 4 does not comprise the address of the network element or device to which the packet flow should be forwarded. The look-up table does not even comprise a match of the address of the network element with a target, for example port of the switch 4, where to forward the packet flow. Therefore, the switch 4 does not know the network element which is the addressed destined receiver of the packet flow to which the packet flow should be finally sent and the switch 4 does not even know via which port, here output port of the switch, the packet flow should be forwarded. Therefore, the packet flow is unknown to the switch 4. The switch 4 forwards the unknown packet flow or one or more packets of the unknown packet flow to the centralized controller 5 (FIG. 5, ref. sign 9i). The centralized controller 5 determines the target of the packet flow and sends an indication of the target of the packet flow back to the switch 4 (FIG. 5, ref. sign 9j) which based on this indication is informed of the target of the packet flow, i.e. the switch 4 now knows the address which is indicated in the packets of the packet flow as the target and forwards the packet flow to the address which is now known to the switch 4. For example, the switch 4 is informed by the indication that the packet flow is to be forwarded to one of the second network elements 7 and accordingly forwards the packet flow to the indicated network element 7 (FIG. 5, ref. sign. 9k).

Preferably, in the aforementioned embodiment, for determining the target of the unknown packet flow received by the switch 4, the switch 4 might not send all packets of the unknown packet flow to the centralized controller 5, but the switch 4 sends only one or more of the packets of the received unknown packet flow to the centralized controller 5. The centralized controller 5 receives the one or more packets of the packet flow unknown to the switch 4. The centralized controller 5 determines the target of the packet flow. The centralized controller 5 might determine the target of the packet flow by a look-up table which comprises the addresses of the network elements and devices of packet flows.

The centralized controller 5 indicates the target of the packet flow to the switch 4. Preferably, the centralized controller 5 will indicate the target of the packet flow in one or more of the packets of the packet flow which have been sent before from the switch 4 to the centralized controller 5 and send one or more of the packets with the indicated address in a manner known to the switch 4 back to the switch 4. The indication of the target might be provided in that the centralized controller 5 informs the switch of the address of the packets so that the switch 4 knows to which network elements, the address of the packet flow belongs, i.e. where to forward the packet flow, and can forward the packet flow accordingly. In another implementation, the indication of the target might be in particular the port address of the switch 4 via which the switch 4 will forward the packet flow. In this case, the switch 4 might even not know, to which network element the packet flow will be finally sent, but the switch 4 is informed to forward the packet flow via the indicated port of the switch 4 and will forward the packet flow accordingly via the indicated port. In another implementation, the indication of the target of the packet flow or of the port of the switch 4 for forwarding of the packet flow is sent from the centralized controller 5 to the switch in a message which comprises this necessary forwarding information, in particular port of the switch 4 for forwarding or information of the network element to which the packet flow is to be forwarded, for example by indicating a target address with forwarding information as a supplement of the missing entry in the look-up table of the switch 4.

Figure 6:
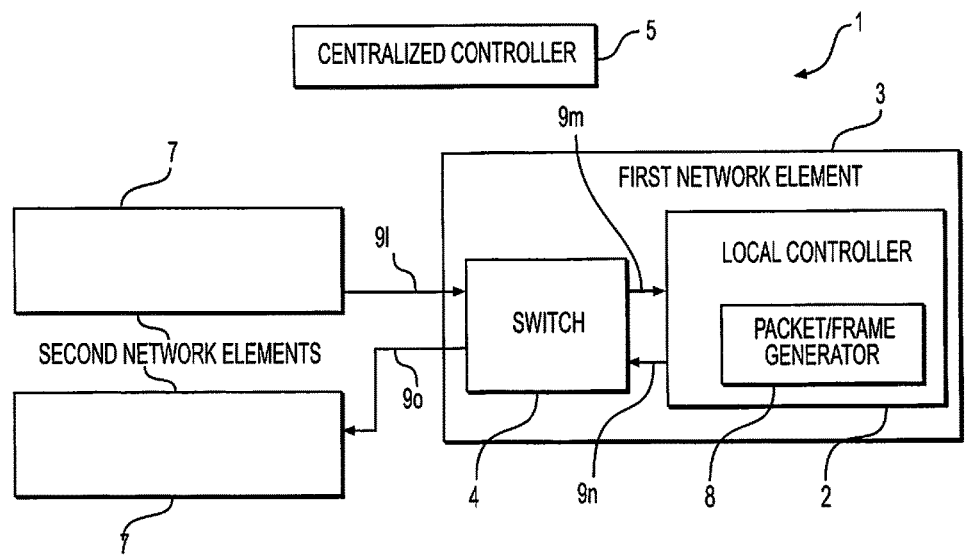
FIG. 6 depicts elements of a communication network and steps of a method for providing control in a communication network

In another preferred embodiment depicted in FIG. 6, the switch 4 is configured to send packets of a packet flow which are unknown to the switch 4 to the local controller 2. In this case, the target of the packets is determined and indicated by the local controller 2. The switch 4 receives a packet flow (FIG. 6, ref. sign. 9l) and determines that the packet flow is unknown to the switch 4, because the configuration of the switch 4, in particular the look-up table of the switch 4, does not comprises the address of the network element (where to forward the packet flow) indicated in the packets of the packet flow received by the switch 4. Therefore, the switch 4 does not know the network element which is the addressed destined receiver of the packet flow to which the packet flow should be sent. Furthermore, the look-up table of the switch 4 does not even comprise a match of the indicated address with a port of the switch 4 via which the packet flow should be forwarded. Therefore, the packet flow is unknown to the switch 4. According to its configuration, the switch 4 forwards the unknown packet flow to the local controller 2 (FIG. 6, ref. sign 9m). The local controller 2 determines the target of the packet flow and sends the indication of the target of the packet flow back to the switch 4 (FIG. 6, ref. sign 9n). Based on this indication the switch 4 is informed of the target of the packet flow, i.e. the switch 4 now knows the address which is indicated in the packets of the packet flow and forwards the packet flow accordingly. In this example, the switch is now informed that the packet flow should be forwarded to one of the second network elements 7 and forwards the packet flow accordingly (FIG. 6, ref. sign 9o).

Preferably, in the aforementioned embodiment, for determining the target of the unknown packet flow received by the switch 4, the switch 4 might not send all packets of the unknown packet flow to the local controller 2, but the switch 4 sends only one or more of the packets of the received unknown packet flow to the local controller 2. The local controller 2 receives the one or more packets of the packet flow unknown to the switch 4. The local controller 2 determines the target of the packet flow. The local controller 2 might determine the target of the packet flow by a look-up table which comprises the addresses of the network elements and devices of packet flows. The local controller 2 indicates the target of the packet flow to the switch 4. Preferably, the local controller 2 will indicate the target of the packet flow in one or more of the packets of the packet flow which have been sent before from the switch 4 to the local controller 2 and send one or more of the packets with the indicated address back to the switch 4 in a manner by which the switch can determine the target address where to forward the packet flow corresponding to the indicated address. The indication of the target might be provided in that the local controller 2 informs the switch 4 of the address of the packets so that the switch 4 knows to which network elements the address of the packet flow belongs and can forward the packet flow accordingly. In another implementation, the indication of the target might be in particular the port address of the switch 4 via which the switch 4 will forward the packet flow. In this case, the switch 4 might even not know, to which network element the packet flow will be finally sent, but the switch 4 is informed to forward the packet flow via the indicated port of the switch 4 and will forward the packet flow accordingly via the indicated port. In another implementation, the indication of the target of the packet flow or of the port of the switch for forwarding of the packet flow is sent from the local controller 2 to the switch 4 in a message which comprises this necessary forwarding information, in particular port of the switch for forwarding or information indicating the network element corresponding to the target address.

In preferred embodiments, the forwarding of packets is based on the configuration of the switch 4 and based on rules applied by the local controller 2 according to the configuration of the local controller 2. In other words, if packets are to be forwarded by the switch 4, the switch 4 will determine the forwarding according to its configuration which is provided by the configuration messages received from the centralized controller 5 as described above. Furthermore, in preferred embodiments, the switch might apply rules on the forwarding which are applied by the local controller 2 which therefore is configured accordingly by configuration messages from the centralized controller 5. This means, the configuration of the switch 4 and of the local controller 2 is provided by the centralized controller 5 by means of the configuration messages. Then, if the switch 4 has to forward a particular packet flow, the switch 4 will determine the forwarding based on the configuration of the switch 4 which might be sufficient for determining the forwarding of a particular packet flow. However, in other situations, the configuration of the switch 4 which is provided by the centralized controller 5 might indicate that for the forwarding of a particular packet flow, rules from the local controller 2 might be applied in addition. For this reason, the local controller 2 has been configured before-hands by the centralized controller 5 with said rules that the local controller 2 will apply on the processing of the forwarding of said particular packet flow by the switch 4. It could be said, that some detail configuration of the switch 4 is provided by the centralized controller 5 via the local controller 2 by means of rules provided from the centralized controller 5 to the local controller 2 for the detail configuration of the switch 4. Therefore, the centralized controller 5 does not need to provide the configuration of the switch 4 in every detail, for example with all topology information needed to determine the forwarding of packet flows, but is deprived of the burden thereof. For example, the local controller 2 might be configured to collect and store topology information of the communication network 1. Based on the topology information, the local controller 2 might send rules on the forwarding of packets to the switch 4. The local controller 2 for this reason first determines rules for the forwarding of packet flows based on the topology information stored at the local controller 2. The local controller 2 then sends these forwarding rules to the switch 4 which will determine the forwarding of particular packet flows by these forwarding rules provided from the local controller 2, as far as these forwarding rules apply to these particular packet flows.

In preferred embodiments, for controlling the one or more packet flows packets of a packet flow are forwarded to the local controller 2. The local controller 2 interprets header fields in the received packets of the packet flow based on rules according to the configuration of the local controller 2 and forwards the packets accordingly. The local controller 2 for this reason can be configured to interpret header fields in any way the operator of the local controller 2 wants the local controller 2 to interpret the header fields. For example, the local controller 2 might be configured to interpret the address fields of packets in any way according to the configuration of the operator. The local controller 2 can therefore be configured to process any packet formats of received packets, in particular according to any protocol.

Figure 7:
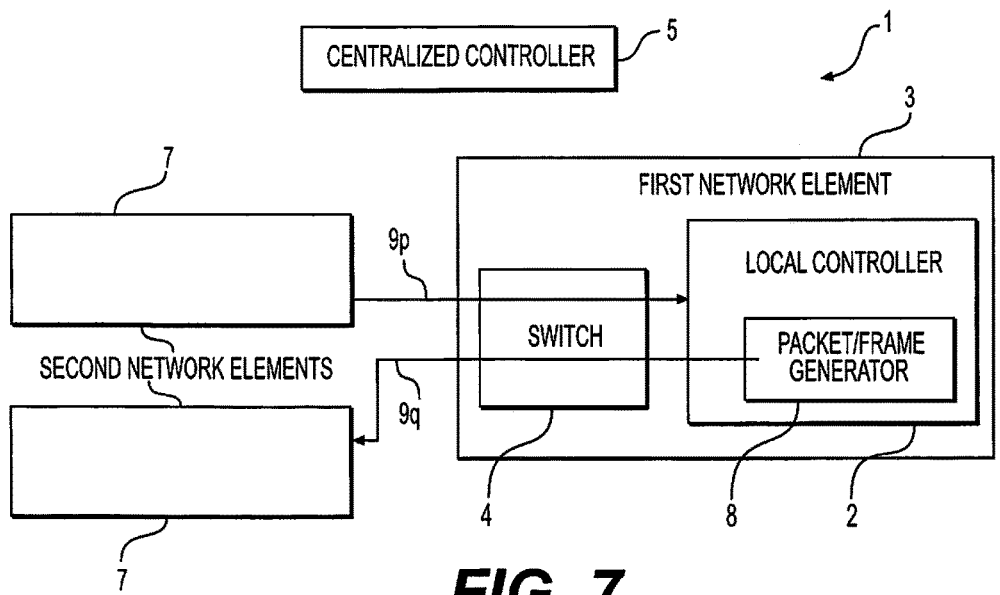
FIG. 7 depicts elements of a communication network and steps of a method for providing control in a communication network

Preferably, the local controller 2 can not only interpret header fields of received packets, but the local controller 2 can also generate new header fields of the received packets. Preferably, the local controller is configured to interpret header fields of received packets and then generate new header fields in the packets received. In the example depicted in FIG. 7, the local controller 2 receives via the switch 4 packets of a packet flow from one of the second network elements 7 (FIG. 7, ref. sign. 9p). The local controller 2 interprets the header fields of the received packets and generates new packet header fields. Preferably, the local controller 2 comprises a packet/frame generator 8. By means of the packet/frame generator 8, the local controller 2 is able to generate new packets with new header fields for packets to be sent. Typically, the local controller 2 calls the packet generator function with suitable parameters to generate the desired header fields. The local controller 2 might be configured to generate packets with two times six bytes address instead of two times eight bytes address, if six bytes are sufficient to encode all the addresses which are used in the communication network 1, the remaining address might be used for extended packet type field. Such packet formats might be useful for the introduction of new technologies, which need less address space, but extended packet type differentiation.

Preferably, the local controller 2 receives packets with the six byte address definition (FIG. 7, ref. sign 9p), and generates packets with a six bytes address for the source address and a six bytes address for the target address. As the new generated packets with the new header fields need only twelve bytes for the source and target address in total and not sixteen bytes anymore, four bytes are free for further use. For example, these free bytes might be used to indicate extended packet types and/or a priority of packets for further processing. The local controller 2 might then send the new packets with the new generated header fields to the switch 4 for further forwarding to one of the second network elements 7 (FIG. 7, ref. sign 9q).

In preferred embodiments, the local controller 2 creates one or more messages by means of the packet/frame generator 8 and sends the one or more messages via the switch 4 to one or more of the one or more second network elements 7. The local controller 2 might be configured not only to forward and receive packets of packet flows as described above, but also to create new packets and forming out of the packets new messages. In this case the local controller 2 generates new messages generically, this means the local controller 2 not only change packets, but generates packets originally. Thus, the local controller 2 creates messages from the scratch or generically. These messages might be periodic messages to direct neighbours like hello messages used by routing protocols. By hello messages, the network elements indicate their presence to other network elements. For example, the first network element 3 indicates its presence to one or more of the second network elements 7 (and possibly in the other way round also the first network element 3 is informed of the presence of one or more, preferably all, second network elements 7 by corresponding hello messages from the local controllers of the second network elements 7 and forwarded hop-by-hop through the communication network 1). The network elements 3, 7 might therefore be provided with the information on the existence of the other network elements 7, 3.

In preferred embodiments, the messages created by the local controller 2 might be link integrity checks, operation and maintenance messages such as trace, loopback and ping messages. If the topology discovery is delegated to network elements and then provided by the local controller inside the respective network element, the messages created by the local controller 2 might be link state protocol data units (LSPs) which are used by routing protocols.

In a preferred embodiment, one or more packets of the packet flow are forwarded (FIG. 7, ref. sign. 9p) to the local controller (2). The local controller (2) receives the one or more packets of the packet flow. The local controller (2) interprets header fields in the received packets of the packet flow based on rules according to the configuration of the local controller (2) and terminates the packets of the packet flow by processing the packets of the packet flow by means of its internal protocol stack.

Figure 8:
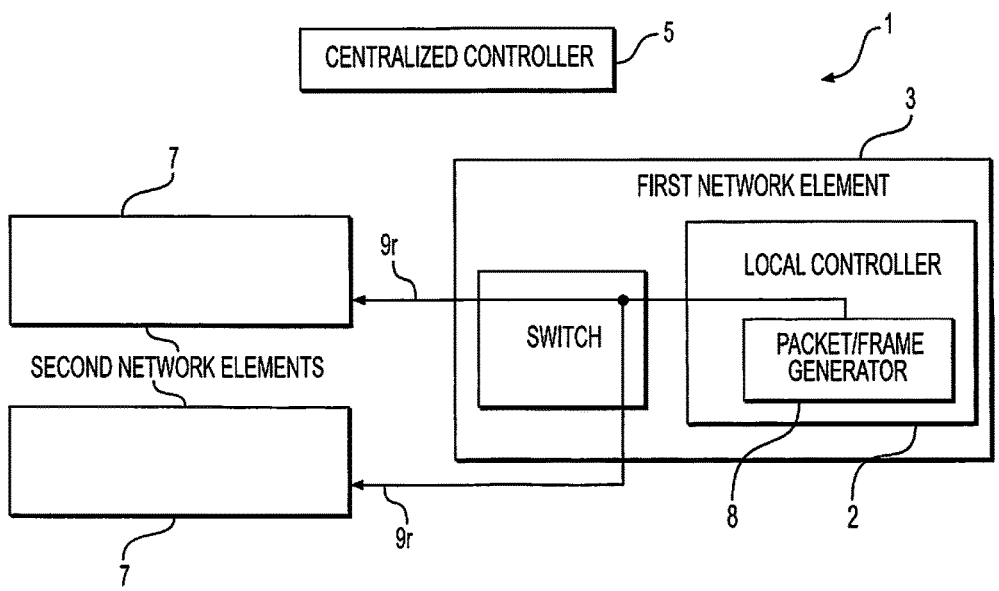
FIG. 8 depicts elements of a communication network and steps of a method for providing control in a communication network

For exemplary reasons, FIG. 8 depicts hello messages created by the local controller 2 by means of the packet/frame generator 8 and send via the switch 4 to second network elements 7 (FIG. 8, ref. sign 9r).

In preferred embodiments, the local controller 2 might be configured to maintain local state of the communication network 1 or of a part of the communication network 1. Therefore, the local controller 2 is configured to store a table of learned MAC addresses, a database of routing-protocol neighbours and/or a topology database. The local controller 2 might receive MAC addresses by neighbour advertisement or equivalent messages from second network elements 7 and stores this information in a database. The local controller 2 might receive information of MAC addresses of second network elements 7 from the centralized controller 5 and store this information in a database.

Similarly, the local controller 2 might implement state machines storing the current state of protocol peer entities and update this state based on information contained in packets received from the corresponding protocol peers or other protocol peers.

Similarly, the local controller 2 might implement a database of routing-protocol neighbours with any suitable information on the routing-protocol neighbours and/or a topology database based on information messages from the second network elements 7 and/or from the centralized controller 5. Because of this implementation, the centralized controller 5 might be deprived or relieved of storing all information of the communication network 1, as far as the information is stored in the local controllers. In either case, the communication to and from the centralized controller 5 to provide and obtain this information to and from the centralized controller 5 is reduced as far as this information can be provided to and obtained from the local controller 2 of the first network element 3 and/or the local controllers of the second network elements 7.

Preferably, the centralized controller 5 communicates with the switch 4 of the first network element 3 and with the local controller 2 of the first network element 3 via an interface preserving the concept of open programmability. The interface between the centralized controller 5 on one side and the first network element 3 comprising the switch 4 and the local controller 2 on the other side might be termed as Southbound interface. This interface might be defined by the OpenFlow protocol. Same applies for the communication between the centralized controller 5 and the second network elements 7.

Preferably, the local controller 2 can be configured in any way how the operator of the network element 3 wants to configure the local controller 2. This means for the configuration of the local controller 2 the operator is not restricted by vendor-specific implementation or pre-configuration. Thus, the operator of the network element 3 including the local controller 2 is able to provide a complete configuration of the local controller 2, and not only to configure some parameters according to a pre-configuration of the vendor of the network element 3 including the local controller 2. Similarly, the operator of the network element 3 might provide a complete configuration of the switch 4 not-restricted by vendor-specific implementation or pre-configuration.

The first network element 3 comprises the switch 4 and the local controller 2 (see FIG. 1). The switch 4 and the local controller 2 are adapted to receive configuration messages from the centralized controller 5 and adapted to control one or more packet flows between one or more of the switch 4 of the first network element 3, the local controller 2 of the first network element 3, the centralized controller 5 and one or more second network elements 7 based on the configuration of the switch 4 and of the local controller 5 of the first network element 3.

In a preferred embodiment, the local controller 2 comprises a plurality of modules within the first network element 3, wherein each module of the plurality of the modules implements one or more tasks different from the tasks implemented by the other modules of the plurality of the modules, wherein each of the modules is addressed via one logical port different from the logical ports of the other modules.

In a preferred embodiment, the local controller 2 might be implemented in a modular manner comprising a plurality of satellite controllers with different tasks within the first network element 3. Each of the satellite controllers might be addressed via one logical port different from the logical ports of the other satellite controllers of the modularly implemented local controller 2. One or more satellite controllers might be connected to the same physical port and differentiated via sub-addresses, i.e. logical ports, while one or more further satellite controllers might be connected to another physical port and differentiated via sub-addresses, i.e. logical ports.

In a preferred embodiment, the local controller 2 comprises a plurality of instances, in particular software instances, within the first network element 3, wherein each of the instances of the local controller 2 implements one or more tasks and wherein each of the instances of the local controller 2 is controllable by one administrator of a plurality of administrators.

The present invention improves the scalability in comparison with an implementation which provides only a centralized controller, but does not provide any local controllers such as a centralized SDN architecture. Based on the concept of the local controller implemented in the network elements, the communication network can be expanded without overburdening the centralized controller, because much of the control functions as described above are provided by the local controller(s), i.e. by the network elements including the local controllers. Furthermore, based on the decentralized implementation, the implementation of back-up controllers is facilitated, enhancing the availability of the control of the communication network. Back-up controllers for the centralized controller, which is in this scenario termed primary centralized controller, should be activated in case the primary centralized controller fails. Due to the implementation of the local controller, the implementation of the back-up controllers is facilitated, because the centralized controller and therefore also the back-up centralized controller do not need to be provided with all information on the communication network to the extent this information is stored and provided by the local controllers.

Furthermore, the present invention provides the advantage of reduced response times because of the local controllers. As control information exchanged between the local controllers and the network elements is faster as if control information were always be exchanged with the centralized controller, the process of providing the necessary control information is fastened and the response times therefore reduced. Similarly, in case a local controller determines that a requested or expected message from another network element, for example a hello message, is missing, the local controller can react faster to this failure as the centralized controller, because the transmission time to the local controller is shorter than to the centralized controller. Furthermore, the capacity of the control network can be reduced based on the implementation of the local controllers. For example, the topology information might be configured statically in each network element and/or might be provided and updated by lists of topology information exchanged between the local controllers. If all topology information had to be exchanged between the network elements and the centralized controller, the control packet flows would be immense. Due to the local controllers, the control information, e.g. topology information must only be forwarded between the network elements including the local controllers thereby reducing the control information packet flows. For the same reason, the synchronization of e.g. topology databases for redundant controllers is facilitated because of the local controllers which can provide a current copy of their stored topology database to the back-up controller directly. A back-up controller might be implemented for the centralized controller. In preferred embodiments, modules of a modularly implemented local controller 2 might have back-up functions for other modules of the modularly implemented local controller 2.

The present invention provides the advantage of an open interface between the centralized controller and the network elements. Therefore, the operator of the network elements might configure the local controller and further the switch in any way the operator wants to configure theses devices without restriction of the vendor of the network elements, switches and local controllers. Because of the open interface, the operator is able to introduce new protocols, packet formats and technologies. As the control function is provided by the local controllers in the network elements, commodity hardware can be used for the switches, which is cheaper as for switches which have extended control functions (same applies for routers if routers are used). The local controller is not a monolithic operating system, but a programming space where code can be flexibly changed during operation, certain new features, in particular new packet format and/or protocols can be loaded without service interruption or reboot. Even the upgrade of an entire network with a new function can be automated via an application connecting to the Northbound interface of the centralized controller.

The invention claimed is:

1. A method for providing control in a communication network comprising one or more network elements, the method comprising:
   receiving, by a first network element of the communication network, one or more configuration messages from a centralized controller, the first network element comprising a switch and a local controller;
   configuring the switch and the local controller of the first network element based on the one or more configuration messages received from the centralized controller; and
   controlling one or more packet flows between at least two of (i) the switch, (ii) the local controller, (iii) the centralized controller, and (iv) one or more second network elements, the controlling the one or more packet flows being based on configuration of the switch and the local controller, wherein the controlling the one or more packet flows comprises,
      receiving, by the switch, packets of a first packet flow of the one or more packet flows;
      deciding, by the switch, where to forward the packets of the first packet flow based on determining whether the first packet flow is a known packet flow or an unknown packet flow according to the configuration of the switch; and
      in response to determining that the first packet flow is an unknown packet flow,
         sending, by the switch, at least one packet of the unknown packet flow to the local controller according to a default setting of the configuration of the switch,
         receiving, by the switch, an indication from the local controller identifying forwarding information for the unknown packet flow according to the configuration of the local controller, and
         forwarding, by the switch, the packets of the unknown packet flow based on the indication received from the local controller.

2. The method according to claim 1, wherein the configuring the local controller comprises:
   receiving, by the switch, the one or more configuration messages from the centralized controller, the one or more configuration messages including at least,
      a first configuration message addressed to the switch, the switch being configured based on the first configuration message, and
      a second configuration message addressed to the local controller, the second configuration message being different from the first configuration message; and
   forwarding, by the switch, the second configuration message to the local controller according to the configuration of the switch, the local controller being configured based on the second configuration message.

3. The method according to claim 1, wherein the controlling the one or more packet flows comprises:
   forwarding, by the switch, the packets of the first packet flow to the centralized controller, to the local controller, or to one or more of the one or more second network elements according to a result of the deciding by the switch of where to forward the packets of the first packet flow.

4. The method according to claim 1, wherein the controlling the one or more packet flows comprises:
   in response to determining that the first packet flow is a known packet flow according to the configuration of the switch,
      determining, by the switch, a corresponding known target of the packets of the known packet flow according to the configuration of the switch, and
      forwarding, by the switch, the packets of the known packet flow to the corresponding known target.

5. The method according to claim 1, wherein the controlling the one or more packet flows comprises:
   forwarding, by the switch, one or more packets of the one or more packet flows to one or more of the one or more second network elements according to the configuration of the switch and based on rules applied by the local controller according to the configuration of the local controller.

6. The method according to claim 1, wherein the controlling the one or more packet flows further comprises:
   forwarding, by the switch, the packets of the first packet flow to the local controller according to the configuration of the switch;
   interpreting, by the local controller, header fields in the packets of the first packet flow based on rules according to the configuration of the local controller;
   adapting, by the local controller, the packets of the first packet flow by changing the header fields in the packets of the first packet flow based on the interpreting; and
   forwarding, by the local controller via the switch, the adapted packets according to the configuration of the local controller.

7. The method according to claim 6, wherein the controlling the one or more packet flows further comprises:
   generating, by the local controller, new packets with new header fields based on the interpreting.

8. The method according to claim 7, wherein the controlling the one or more packet flows further comprises:
   creating, by the local controller, one or more messages including the new packets with the new header fields; and
   sending, by the local controller via the switch, the one or more messages to one or more of the one or more second network elements according to the configuration of the local controller.

9. The method according to claim 1, wherein the method further comprises:
   maintaining, by the local controller, a local state of the communication network by storing one or more of (i) state machines of peer entities, (ii) table of learned MAC addresses, (iii) a database of routing-protocol neighbors, and (iv) a topology database, based on information received from the centralized controller or collected from the one or more second network elements; and
   the controlling the one or more packet flows further comprises,
      receiving, by the local controller, the at least one packet of the unknown packet flow from the switch,
      determining, by the local controller, the forwarding information for the unknown packet flow according to the configuration of the local controller and the local state of the communication network maintained by the local controller, and
      sending, by the local controller, the indication identifying the forwarding information for the unknown packet flow to the switch according to the configuration of the local controller.

10. The method according to claim 1, wherein the switch and the local controller communicate with the centralized controller via an interface enabling open programmability defined by OpenFlow protocol.

11. The method of claim 1, wherein the configuring the local controller comprises:
   enabling, via the centralized controller and an interface, a user to configure the local controller in any desired way without being restricted by any vendor-specific implementation or pre-configuration by a vendor of the first network element or the local controller.

12. The method according to claim 1, wherein the local controller comprises:
   a plurality of modules within the first network element, wherein each module of the plurality of modules implements one or more tasks different from tasks implemented by other modules of the plurality of the modules, wherein each module is addressed via one logical port different from logical ports of the other modules; or
   a plurality of software instances within the first network element, wherein each software instance of the plurality of software instances implements one or more tasks and is controllable by a different user among a plurality of users.

13. A first network element comprising,
   a switch; and
   a local controller,
   the first network element being adapted to,
      receive one or more configuration messages from a centralized controller;
      configure the switch and the local controller based on the one or more configuration messages; and
      control one or more packet flows between at least two of (i) the switch, (i) the local controller, (iii) the centralized controller, and (iv) one or more second network elements, the controlling the one or more packet flows being based on configuration of the switch and the local controller, wherein the controlling the one or more packet flows comprises,
         receiving, by the switch, packets of a first packet flow of the one or more packet flows;
         deciding, by the switch, where to forward the packets of the first packet flow based on determining whether the first packet flow is a known packet flow or an unknown packet flow according to the configuration of the switch; and
         in response to determining that the first packet flow is an unknown packet flow,
            sending, by the switch, at least one packet of the unknown packet flow to the local controller according to a default setting of the configuration of the switch,
            receiving, by the switch, an indication from the local controller identifying forwarding information for the unknown packet flow according to the configuration of the local controller, and
            forwarding, by the switch, the packets of the unknown packet flow based on the indication received from the local controller.

* * * * *